United States Patent

[11] 3,603,624

| [72] | Inventor | Lawrence A. Attermeyer |
| | | Cincinnati, Ohio |
| [21] | Appl. No. | 840,333 |
| [22] | Filed | July 9, 1969 |
| [45] | Patented | Sept. 7, 1971 |
| [73] | Assignee | The Cincinnati Milling Machine Co. |
| | | Cincinnati, Ohio |

[54] ANTIBACKLASH COUPLING
22 Claims, 12 Drawing Figs.

[52] U.S. Cl. .................................................. 287/109
[51] Int. Cl. ................................................... F16d 1/00
[50] Field of Search ......................................... 287/108,
109, 110, 111, 118, 52.05, 52.08, 53 SS; 64/1, 1 S, 6, 9

[56]  References Cited
UNITED STATES PATENTS

| 52,162 | 1/1866 | Gray .............................. | 287/108 UX |
| 481,092 | 8/1892 | Barnaby ........................ | 287/110 |
| 992,352 | 5/1911 | Hansler ......................... | 287/110 |
| 1,183,190 | 5/1916 | Hansell ......................... | 287/110 UX |
| 1,291,388 | 1/1919 | Bright et al. .................. | 287/109 X |
| 1,760,845 | 5/1930 | Kettering et al. .............. | 287/109 |
| 3,008,310 | 11/1961 | Bastow et al. ................. | 64/1 S |
| 3,328,976 | 7/1967 | Shoemaker et al. ........... | 64/6 X |

FOREIGN PATENTS

| 18,177 | 5/1882 | Germany ....................... | 287/52.08 |
| 62,321 | 6/1944 | Denmark ....................... | 287/52.05 |
| 643,225 | 7/1962 | Italy .............................. | 287/110 |
| 1,018,276 | 1/1966 | Great Britain ................. | 64/9 |

*Primary Examiner*—David J. Williamowsky
*Assistant Examiner*—Andrew V. Kundrat
*Attorney*—Frank C. Leach, Jr.

ABSTRACT: A hollow tubular member of a ductile material connects driving and driven shafts to each other through having equally angularly spaced portions deformed for disposition within equally angularly spaced grooves in each of the driving and driven shafts. By selecting the size of the grooves and retaining means, which are carried by the hollow tubular member but movable into the grooves for cooperation with the equally angularly spaced portions of the hollow tubular member to retain the portions in the grooves, there is no reliance on friction so that the coefficient of friction can be exceeded in the transmission of torque. The hollow tubular member provides a rigid connection between the driving and driven shafts so that there is no backlash.

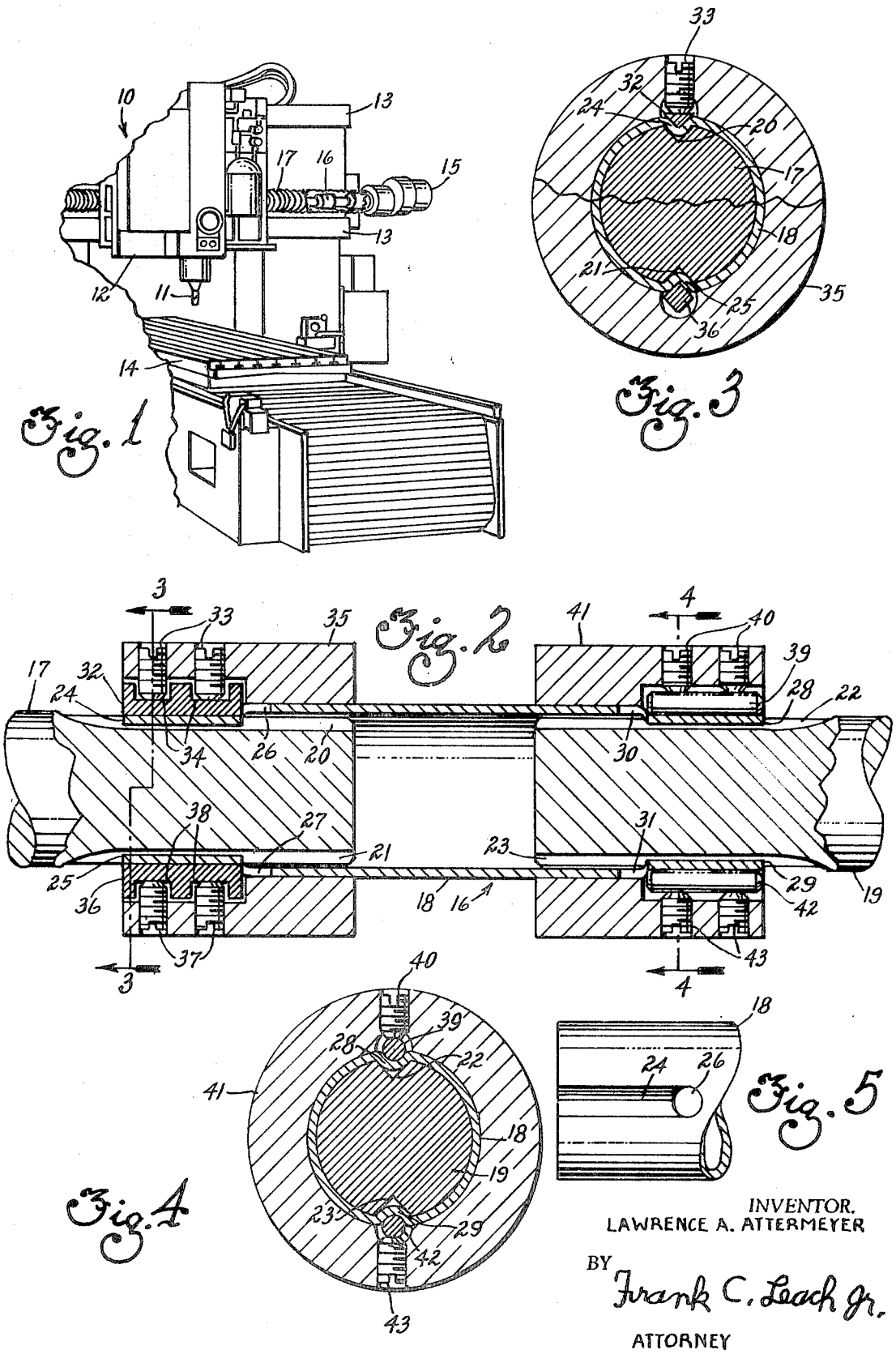

ANTIBACKLASH COUPLING

In numerical controlled machine tools, the precise position of the cutting element must be known for the cutting element to cut with very small tolerances. Thus, if there is backlash in a servo drive of a numerical controlled machine tool, the precise position of the cutting element will not be ascertained to the desired accuracy to obtain very small tolerances.

If a slide is driven by a drive motor through a ball screw in the numerical controlled machine tool with the slide connected to the cutting element for moving the cutting element in one direction, the position of the slide must be accurately ascertained. However, if the position feedback signal is taken from the drive motor in accordance with the amount of rotation of the drive motor, the backlash in the connection between the ball screw and the shaft of the drive motor results in positional errors. While these positional errors are relatively small, they can prevent the desired small tolerances to which the part is to be cut.

If the position feedback signal is taken from the end of the ball screw that is not coupled to the drive motor shaft, backlash produces nonlinear errors in both the position and velocity servo loops. These can result in servo instability whereby the precise position of the cutting element is not stable due to continued hunting of the servosystem.

If the position feedback signal is taken directly from the slide to which the cutting element is connected, backlash in the coupling between the ball screw and the motor drive shaft produces nonlinear errors in the position servo loop. This also can result in servo instability.

The present invention satisfactorily solves the foregoing problems by providing a coupling in which the backlash between a driving member and a driven member is eliminated so that there is a rigid connection between the driving and driven members. The present invention relies upon interfering or engaging metal surfaces to transmit torque rather than on the coefficient of friction between metal surfaces so that there is no slippage of the coupling relative to either the drive member or the driven member during transmission of torque due to the coefficient of friction being exceeded. Thus, backlash between the driving member and the driven member is eliminated.

The present invention utilizes a hollow tubular member of a relatively ductile material that is easily deformable without material failure. By disposing spaced portions of the ductile material within cooperating spaced grooves in the driving and driven members and retaining these portions within the grooves, the coupling of the present invention is formed so that it does not rely upon the coefficient of friction for transmission of torque but only upon the surface pressures between the driven and driving members and the coupling.

An object of this invention is to provide an antibacklash coupling.

Another object of this invention is to provide a coupling for connecting driving and driven members to each other in which the coupling provides a rigid connection.

A further object of this invention is to provide a coupling utilizing surface pressures between mechanically formed elements to transmit the torque from the driving member to the driven member through the coupling.

Other objects of this invention will be readily perceived from the following description, claims, and drawings.

This invention relates to a coupling for torsionally connecting a driving member to a driven member. The coupling includes a hollow tubular member, which is formed of a ductile material that is capable of being deformed without failure, for disposition over at least one of the driving and driven members. The hollow tubular member has spaced first portions for disposition in cooperating spaced grooves in one of the driving and driven members. The hollow tubular member carries first means, which retain each of the first portions of the hollow tubular member in one of the grooves in the one member.

This invention also results to the combination of a driving member, a driven member, and a coupling to connect the driving member to the driven member. One of the driving and driven members has at least two spaced grooves therein. The coupling includes a hollow tubular member, which is formed of a ductile material that is capable of being deformed without failure and has spaced first portions for disposition within each of the grooves in the one member. First means carried by the hollow tubular member retain each of the first portions of the hollow tubular member in one of the grooves in the one member.

The attached drawings illustrate preferred embodiments of the invention, in which:

FIG. 1 is a perspective view of a machine tool in which the antibacklash coupling of the present invention is employed;

FIG. 2 is a longitudinal sectional view of one embodiment of the coupling of the present invention and showing its connection to the driving and driven members;

FIG. 3 is a cross-sectional view of the coupling of FIG. 2 and taken along line 3—3 of FIG. 2;

FIG. 4 is a cross-sectional view of the coupling of FIG. 2 and taken along line 4—4 of FIG. 2;

FIG. 5 is a top plan view of a portion of the coupling of FIG. 2 with an annular retaining support omitted;

Figure 7:
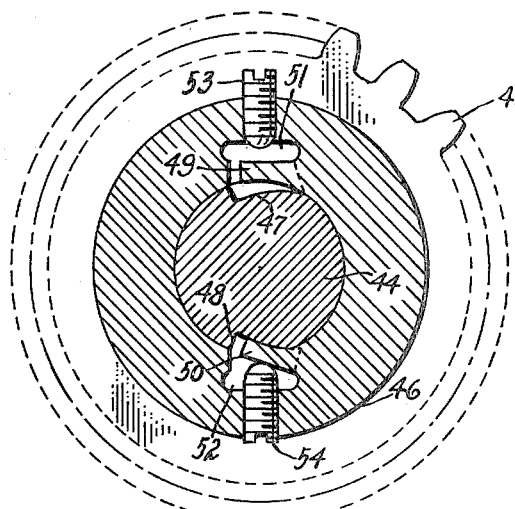
FIG. 7 is a cross-sectional view, partly in elevation, of the coupling of FIG. 6 and taken along line 7—7 of FIG. 6.

Referring to the drawings and particularly FIG. 1, there is shown a machine tool 10 having a cutting element 11 supported on a movable support 12. The cutting element 11 performs cutting operations on a workpiece (not shown), which is supported on a support 14.

The cutting element support 12 is movable transversely of the workpiece support 14 by sliding along ways 13. The support 12 is movable transversely by a drive motor 15, which is supported on the machine tool 10 and connected to the movable support 12 through a coupling 16 of the present invention and a ball screw 17. The ball screw 17 is connected to the support 12 so that rotation of the ball screw 17 causes transverse movement of the support 12 along the ways 13.

The coupling 16 is a hollow tubular member 18 formed of a ductile material that may be deformed without material failure. The hollow tubular member 18 must be capable of being cold formed. One suitable example of the material of the hollow tubular member 18 is 8617 steel that has been spherodize annealed. Any other suitable ductile material, which can be deformed without material failure, may be employed.

As shown in FIG. 2, one end of the hollow tubular member 18 is disposed over one end of a shaft 19 of the drive motor 15. The other end of the hollow tubular member 18 is disposed over one end of the ball screw 17.

The ball screw 17 has a pair of diametrically disposed V-shaped grooves 20 and 21 formed in its end disposed within the hollow tubular member 18. Each of the grooves 20 and 21 has its walls formed perpendicular to each other as shown in FIG. 3. While the ball screw 17 has been shown as having only two of the grooves, it should be understood that any number of the grooves may be formed in the ball screw 17. While the grooves 20 and 21 have been shown as equally angularly spaced from each other, it should be understood that such is not a requisite.

The shaft 19 of the drive motor 15 has a pair of diametrically disposed V-shaped grooves 22 and 23 formed in its end extending into the hollow tubular member 18. Each of the V-shaped grooves 22 and 23 has its walls perpendicular to each other as shown in FIG. 4. While the shaft 19 has been shown as having only two of the grooves, it should be understood that any number of the grooves may be employed. While the grooves 22 and 23 have been shown as equally angularly spaced from each other, it should be understood that such is not a requisite.

The grooves 20 and 21 of the ball screw 17 receive diametrically disposed deformable portions 24 and 25, respectively, of the hollow tubular member 18. The spaced portions 24 and 25 of the hollow tubular member 18 are depressed inwardly from the hollow tubular member 18.

An opening 26 (see FIG. 5) is formed in the hollow tubular member 18 adjacent the portion 24. A similar opening 27 (see FIG. 2) is formed in the hollow tubular member 18 adjacent the portion 25. The openings 26 and 27 permit the deformation of the portions 24 and 25, respectively, without creating any shear stresses in the remainder of the hollow tubular member 18.

The other end of the hollow tubular member 18 has diametrically disposed portions 28 and 29 for disposition within the grooves 22 and 23, respectively, in the shaft 19 of the drive motor 15. Each of the portions 28 and 29 is pressed inwardly from the hollow tubular member 18 by deformation.

In the same manner as the opening 26 is formed adjacent the portion 24, the hollow tubular member 18 has an opening 30 formed therein adjacent the portion 28 and an opening 31 formed therein adjacent the portion 29. The openings 30 and 31 enable the portions 28 and 29, respectively, to be deformed relative to the remainder of the hollow tubular member 18 without creating any shear stresses in the hollow tubular member 18.

The deformed portion 24 of the hollow tubular member 18 is retained within the V-shaped groove 20 in the ball screw 17 by a member 32 having a square-shaped cross section. The square-shaped member 32 has portions of two of its walls penetrating into a circle defined by the periphery of the ball screw 17 as shown in FIG. 3.

A pair of setscrews 33 acts on flat surfaces 34 on the square-shaped member 32 to position the portion 24 within the V-shaped groove 20 in the ball screw 17 and retain it therein. The setscrews 33 are threaded in an annular support 35, which is carried by the hollow tubular member 18.

The deformed portion 25 of the hollow tubular member 18 is retained within the V-shaped groove 21 in the ball screw 17 by a member 36, which has a square-shaped cross section and has portions of two of its walls penetrating into a circle defined by the periphery of the screw 17. A second pair of setscrews 37, which also are carried by the annular support 35, acts on flat surfaces 38 on the square-shaped member 36.

Accordingly, when the portions 24 and 25 of the hollow tubular member 18 are retained within the V-shaped grooves 20 and 21, respectively, in the ball screw 17, the hollow tubular member 18 is fixed to the ball screw 17. Because the portions 24 and 25 are disposed within the V-shaped grooves 20 and 21, respectively, the connection between the ball screw 17 and the hollow tubular member 18 is by a metal-to-metal surface engagement rather than a frictional engagement; thus, transmission of torque between the ball screw 17 and the coupling 16 does not rely upon friction. As a result, there can be no slippage as occurs in couplings in which frictional engagement is employed. Without relying upon friction, there is no slippage in the coupling of the present invention when the coefficient of friction is exceeded as exists with a coupling relying upon frictional engagement for transmission of torque.

The depressed portion 28 of the hollow tubular member 18 is retained within the V-shaped groove 22 in the drive motor shaft 19 by a rod 39 having a circular cross section. Setscrews 40 act on the circular-shaped rod 39 to urge it into retaining engagement with the portion 28 of the hollow tubular member 18. The setscrews 40 are mounted in an annular support 41, which is carried by the hollow tubular member 18.

The depressed portion 29 of the hollow tubular member 18 is retained within the V-shaped groove 23 in the drive motor shaft 19 by a rod 42, which has a circular cross section. Setscrews 43, which are threaded into the annular support 41, act on the circular-shaped rod 42 to retain the portion 29 within the V-shaped groove 23.

As shown in FIG. 4, each of the circular-shaped rods 39 and 42 pushes the portions 29 and 29, respectively, sufficiently into the V-shaped grooves 22 and 23, respectively, in the shaft 19 so that a portion of each of the rods 39 and 40 is disposed inside of a circle defined by the periphery of the shaft 19. This arrangement results in the torque being transmitted from the shaft 19 to the coupling 16 without any dependence upon the coefficient of friction. Instead, the metal-to-metal surface pressure between the walls of the V-shaped groove and the deformed portion of the hollow tubular member 18 is utilized for transmission of torque.

The walls of the V-shaped grooves must be approximately 90° to each other for the desired surface pressure to be created between the hollow tubular member 18 and the ball screw 17 or the shaft 19. If the angle of the walls of the V-shaped grooves should be less than 90° there is a tendency for the deformed portion of the hollow tubular member 18 to become thinner whereby it may fail when transmitting torque. If the angle exceeds 90° the metal-to-metal surface pressure between the groove and the deformed portion of the hollow tubular member 18 becomes too great since only a normal force transmits torque. Thus, as the angle between the walls of the groove increases beyond 90° the necessary surface pressure increases to obtain the same torque transmission as when the walls are perpendicular.

While the hollow tubular member 18 has been shown as having the portions 24 and 25 retained within the grooves 20 and 21, respectively, in the ball screw 17 by the square-shaped members 32 and 36, respectively, it should be understood that the circular-shaped rods 39 and 42 could be employed if desired. Likewise, instead of utilizing the circular-shaped rods 39 and 42 for retaining the portions 28 and 29, respectively, of the hollow tubular member 18 in the V-shaped grooves 22 and 23, respectively, in the drive motor shaft 19, the square-shaped members 32 and 36 could be employed if desired.

Figure 6:
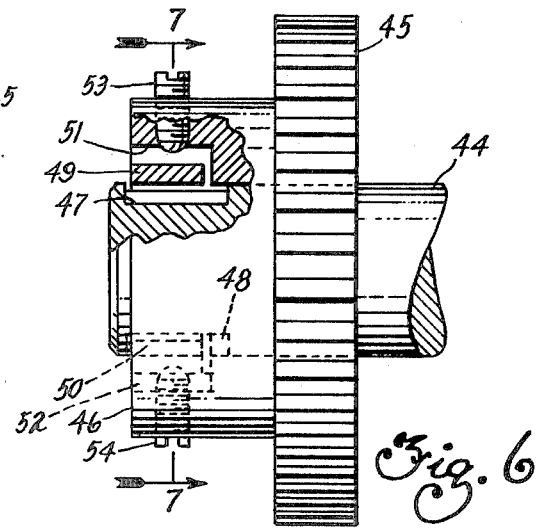
FIG. 6 is a side elevational view, partly in section, of another form of coupling of the present invention.

Referring to FIGS. 6 and 7, there is shown a coupling for connecting a shaft 44 to a gear 45. The gear 45 has a hollow tubular member 46 formed integral therewith. The hollow tubular member 46 is formed of a suitable ductile material. One suitable example of the material of the hollow tubular member 46 is the same material as the material of the hollow tubular member 18.

The shaft 44 has a pair of diametrically disposed grooves 47 and 48 formed therein to receive deformable portions 49 and 50 of the hollow tubular member 46. The hollow tubular member 46 has a slot or opening 51 (see FIG. 6) therein adjacent the portion 49 to permit deformation of the portion 49 into the groove 47 without creating any shear stresses in the hollow tubular member 46. The hollow tubular member 46 has a similar slot or opening 52 (see FIG. 6) therein adjacent the portion 50 to permit deformation of the portion 50 into the groove 48 without creating any shear stresses in the hollow tubular member 46.

Setscrews 53 and 54, which are threaded in the hollow tubular member 46, cooperate with the portions 49 and 50, respectively, to urge the portions 49 and 50 into the grooves 47 and 48, respectively, in the shaft 44 and retain them therein. As shown in FIG. 7, the setscrew 54 is urging the portion 50 into the groove 48 in the shaft 44 for retention therein.

When either the shaft 44 or the gear 45 is rotated clockwise (as viewed in FIG. 7), the depressed portion 50 of the hollow tubular member 46 transmits the torque. When either the shaft 44 or the gear 45 is rotated counterclockwise (as viewed in FIG. 7), the depressed portion 49 of the hollow tubular member 46 transmits the torque. Thus, driving of either the shaft 44 or the gear 45 in either direction results in transmission of torque to the other without any slippage.

Figure 8:
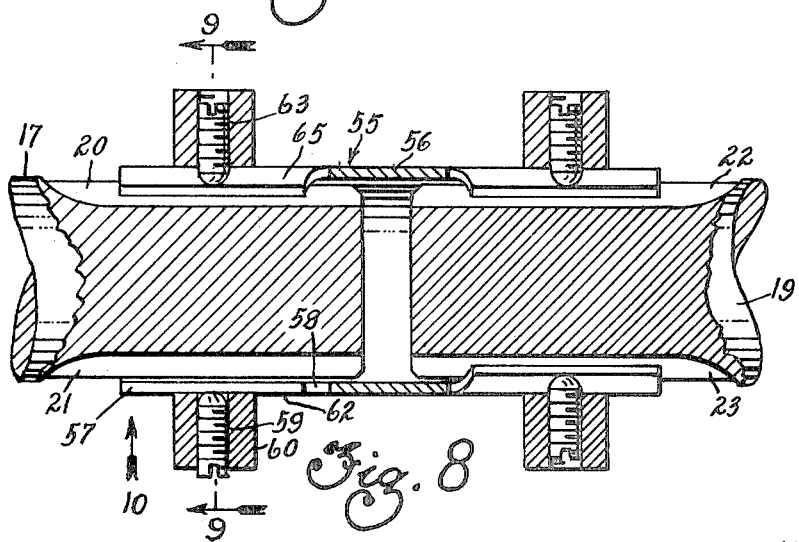
FIG. 8 is a longitudinal sectional view of another form of the coupling of the present invention for connecting driving and driven members to each other.
Figure 9:
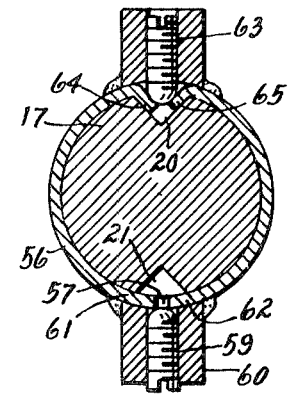
FIG. 9 is a cross-sectional view of the coupling of FIG. 8 and taken along line 9—9 of FIG. 8.
Figure 10:
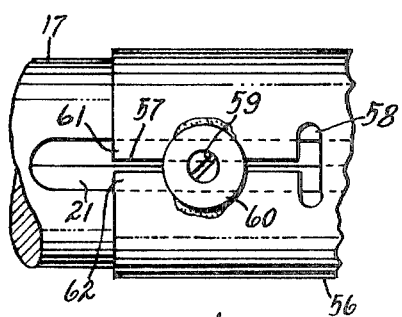
FIG. 10 is a bottom plan view of a portion of the coupling of FIG. 8 and looking in the direction of arrow 10 in FIG. 8.

Referring to FIGS. 8-10, there is shown an antibacklash coupling 55 for connecting the ball screw 17 to the drive motor shaft 19. The coupling 55 includes a hollow tubular member 56, which is formed of a suitable ductile material such as the material of which the hollow tubular member 18 is formed. The hollow tubular member 56 has similar deformable portions disposed in each of the grooves 20 and 21 in the ball screw 17 and the grooves 22 and 23 in the drive motor shaft 19.

As shown in FIG. 10, the hollow tubular member 56 is formed with a longitudinal slit 57, which terminates in a transverse slot or opening 58. Accordingly, when a setscrew 59, which is threaded in a support 60 that is secured to the hollow tubular member 56 by suitable means such as welding, for example, is moved inwardly, portions 61 and 62 of the hollow tubular member 56 on opposite sides of the longitudinal slit 57 are moved into engagement with walls of the V-shaped groove 21 in the ball screw 17. Thus, the setscrew 59 retains the deformable portions 61 and 62 of the hollow tubular member 56 within the V-shaped groove 21 in the ball screw 17. A similar arrangement exists for moving deformable portions of the hollow tubular member 56 inwardly into the V-shaped grooves 20, 22, and 23.

As shown in FIG. 9, a setscrew 63, which urges deformable portions 64 and 65 of the hollow tubular member 56 into the V-shaped groove 20 in the ball screw 17, extends inwardly sufficiently so that it penetrates a circle defined by the periphery of the ball screw 17. This insures that the portions 64 and 65 of the hollow tubular member 56 are disposed within the V-shaped groove 20 so that metal-to-metal surface pressures are employed to transmit the torque from the drive motor shaft 19 to the ball screw 17. Thus, there is no backlash or slippage when using the coupling 55.

Figure 11:
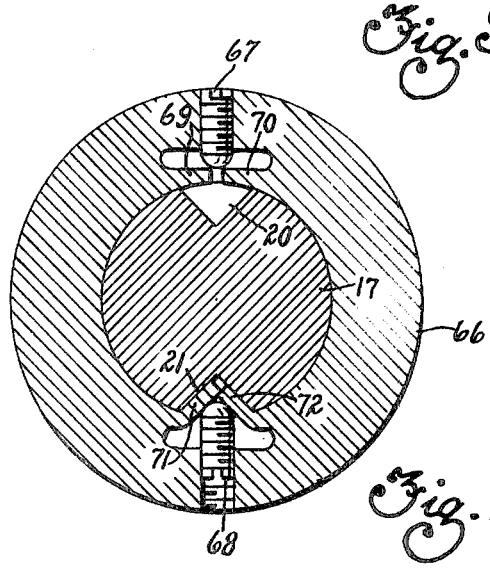
FIG. 11 is an enlarged cross-sectional view of another embodiment of the coupling of the present invention.

Referring to FIG. 11, there is shown another form of coupling for connecting the ball screw 17 to the shaft 19. The coupling includes a hollow tubular member 66, which is formed of a suitable material such as the material of which the hollow tubular member 18 is formed, having sufficient thickness to mount setscrews 67 and 68 therein. The setscrew 67 urges deformable portions 69 and 70 of the hollow tubular member 66 into the V-shaped groove 20 in the ball screw 17. The setscrew 68 urges deformable portions 71 and 72 of the hollow tubular member 66 into the V-shaped groove 21 in the ball screw 17. A similar arrangement of setscrews and deformable portions of the hollow tubular member 66 exists for cooperation with the V-shaped grooves 22 and 23 in the drive motor shaft 19.

Figure 12:
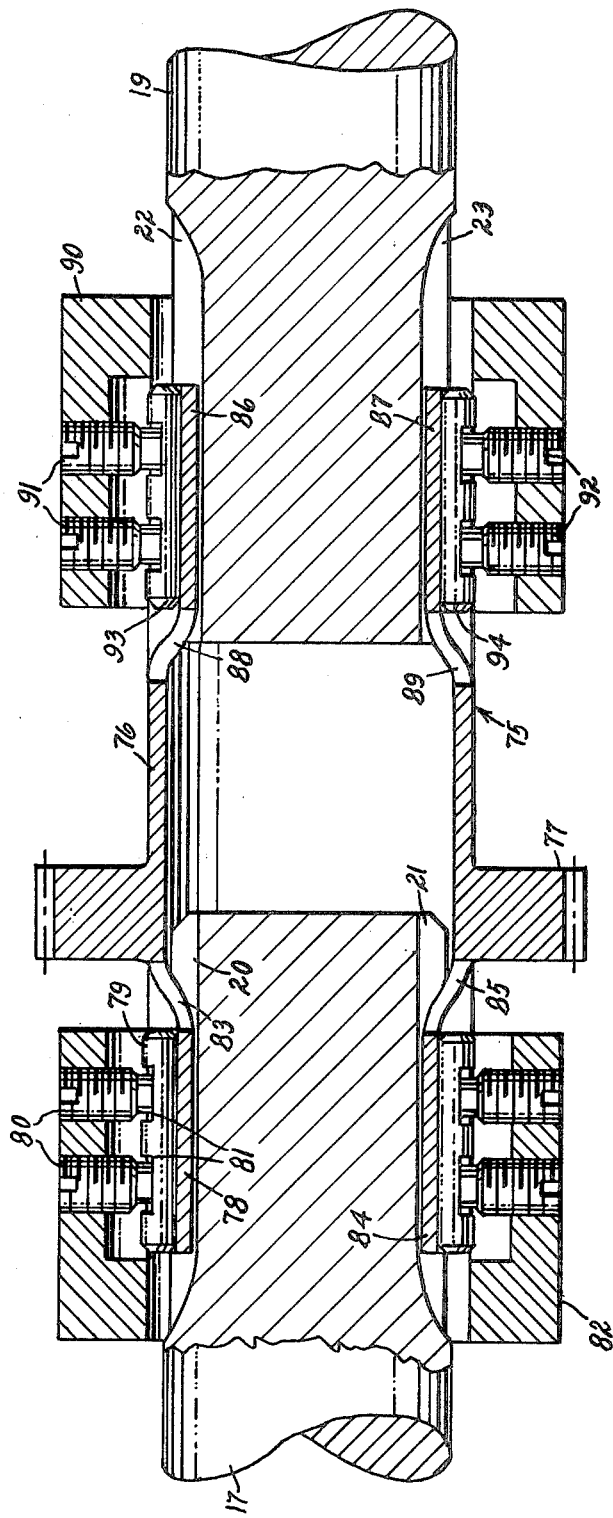
FIG. 12 is a longitudinal sectional view of still another form of coupling of the present invention.

Referring to FIG. 12, there is shown a coupling 75 for connecting the ball screw 17 to the drive motor shaft 19. The coupling 75 includes a hollow tubular member 76 having an annular spline 77 integral therewith for cooperation with a spline (not shown), which can be controlled to either rotate or be prevented from rotating. When the spline 77, which is heat treated to obtain the desired characteristics to function as a spline since the hollow tubular member 76 is formed of a suitable ductile material such as the material of the hollow tubular member 18, is prevented from rotating, the coupling 75 prevents the ball screw 17 from being driven by the drive motor 15 through the shaft 19. Accordingly, when utilizing the coupling 75 with the present invention, control of rotation of the ball screw 17 can be obtained through the coupling 75.

The hollow tubular member 76 has a deformable portion 78 disposed in the V-shaped groove 20 in the ball screw 17. A circular-shaped rod 79 is disposed in contact with the portion 78 to retain the portion 78 within the V-shaped groove 20. A pair of setscrews 80 acts on flat surfaces 81 on the circular-shaped rod 79 to retain the portion 78 within the V-shaped groove 20 in the ball screw 17.

The setscrews 80 are threaded in an annular support 82. The annular support 82 is carried by the hollow tubular member 76.

An opening 83 is provided in the hollow tubular member 76 adjacent the portion 78. Accordingly, there are no shear stresses created in the hollow tubular member 76 during deformation of the portion 78.

A deformable portion 84 of the hollow tubular member 76 is disposed in the V-shaped groove 21 and retained therein in the same manner as the portion 78 is retained in the V-shaped groove 20. An opening 85 is provided in the hollow tubular member 76 adjacent the portion 84 to prevent shearing of the hollow tubular member 76 when the portion 84 is deformed.

The hollow tubular member 76 has deformable portions 86 and 87, which are disposed within the V-shaped grooves 22 and 23, respectively, in the drive shaft 19. The hollow tubular member 76 has an opening 88 adjacent the portion 86 and an opening 89 adjacent the portion 87. Thus, when the portions 86 and 87 are deformed, there are no shear stresses produced in the hollow tubular member 76.

An annular support 90 is carried by the hollow tubular member 76. The support 90 receives setscrews 91 and 92 for cooperating with circular-shaped rods 93 and 94, respectively, to retain the portions 86 and 87, respectively, in the V-shaped grooves 22 and 23, respectively.

In forming the hollow tubular member 76, it is preferred that the portions 78, 84, 86, and 87 be deformed prior to receiving the ball screw 17 and the shaft 19. This is accomplished by utilizing a mandrel having a slightly smaller diameter than the hollow tubular member 76 but larger than the diameter of either the ball screw 17 or the shaft 19. The grooves in the mandrel are more shallow than those in the ball screw 17 or the shaft 19.

After forming the hollow tubular member 76 on the mandrel by means of a press, the removal of the mandrel results in the hollow tubular member 76 shrinking to relieve barrel hoop stresses in the hollow tubular member 76. By having the mandrel slightly larger than the ball screw 17 or the shaft 19, this allows the hollow tubular member 76 to fit over the ball screw 17 and the shaft 19 with a minimum of hand dressing.

The circular-shaped rods are secured to the deformed portions 78, 84, 86, and 87 of the hollow tubular member 76 before assembly of the ball screw 17 and the shaft 19 within the hollow tubular member 76. This prevents any looseness of the rods during assembly.

By forming the hollow tubular member 76 of the material such as 8617 steel and spherodize annealing this material, excessive internal stresses are removed from the hollow tubular member 76 during its deformation on the mandrel.

As an example of the dimensions of the various elements, the hollow tubular member 76 may have an internal diameter ranging from 1.253 to 1.254 inches. The forming mandrel would have an outer diameter of 1.252 to 1.251 inches while the outer diameter of each of the ball screw 17 and the shaft 19 would be 1.250 to 1.249 inches.

If desired, other of the couplings of the present invention could also have their portions deformed on a mandrel prior to assembly of the hollow tubular member over the ball screw 17 and the shaft 19. For example, the hollow tubular member 18 could be so formed.

An advantage of this invention is that it eliminates backlash in a coupling between driven and driving members. Another advantage of this invention is that it is relatively inexpensive. A further advantage of this invention is that there is no dependence on the coefficient of friction for transmitting torque through the coupling.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. A coupling for torsionally connecting a driving member to a driven member, said coupling including:

a hollow tubular member for disposition over at least one of the driving and driven members;

said hollow tubular member being formed of a ductile material that is capable of being deformed without failure;

said hollow tubular member having spaced first portions for disposition in cooperating spaced grooves in one of the driving and driven members to form the sole connection between said hollow tubular member and the one member;

separate means engaging each of said first portions of said hollow tubular member when each of said first portions is disposed in one of the grooves in the one member to retain said first portions of said hollow tubular member in the grooves in the one member;

first means carried by said hollow tubular member and surrounding said separate means;

and radially adjustable means supported by said first means and cooperating with each of said separate means to insure that each of said separate means retains said engaged first portion of said hollow tubular member in the groove in which said engaged first portion is disposed in the one member.

2. The coupling according to claim 1 in which each of said first means comprises a circular-shaped rod that is partially disposed within the grooves in the one number.

3. The coupling according to claim 1 in which said first portions of said hollow tubular member are equally angularly spaced from each other.

4. The coupling according to claim 1 in which:
said hollow tubular member also is disposed over the other of the driving and driven members;
said hollow tubular member has spaced second portions for disposition in cooperating spaced grooves in the other member to form the sole connection between said hollow tubular member and the other member;
second separate means engaging each of said second portions of said hollow tubular member when each of said second portions is disposed in one of the grooves in the other member to retain said second portions of said hollow tubular member in the grooves in the other member;
second means carried by said hollow tubular member to retain each of said second portions in one of the grooves in the other member and surrounding said second separate means;
and means supported by said second means and cooperating with each of said second separate means to insure that each of said second separate means retains said engaged second portion of said hollow tubular member in the groove in which said engaged second portion is disposed in the other member.

5. The coupling according to claim 4 in which each of said first and second means comprises a circular-shaped rod that is partially disposed within the grooves in each of the driving and driven members.

6. The coupling according to claim 4 in which:
said first portions of said hollow tubular member are equally angularly spaced from each other;
and said second portions of said hollow tubular member are equally angularly spaced from each other.

7. In combination:
a driving member;
a driven member;
a coupling to connect said driving member to said driven member;
one of said driving and driven members having at least two spaced grooves therein;
said coupling including a hollow tubular member formed of a ductile material that is capable of being deformed without failure;
said hollow tubular member having spaced first portions for disposition within each of said grooves in said one member to form the sole connection between said hollow tubular member and said one member;

separate means engaging each of said first portions of said hollow tubular member when each of said first portions is disposed in one of said grooves in said one member to retain said first portions of said hollow tubular member in said grooves in said one member;

first means carried by said hollow tubular member and surrounding said separate means;

and radially adjustable means supported by said first means and cooperating with each of said separate means to insure that each of said separate means retains said engaged first portion of said hollow tubular member in said groove in which said engaged first portion is disposed in said one member.

8. The combination according to claim 7 in which said hollow tubular member has openings in its wall having said first portions with each of said openings being adjacent one of said first portions of said hollow tubular member to permit deformation of said first portions for disposition in said grooves in said one member without shearing of said hollow tubular member.

9. The combination according to claim 7 in which
each of said separate means includes a circular-shaped rod disposed within each of said grooves in said one member;
and said supported means includes means acting on each of said rods to retain each of said rods partially in one of said grooves in said one member.

10. The combination according to claim 7 in which each of said grooves has its walls substantially perpendicular.

11. The combination according to claim 10 in which said hollow tubular member has openings in its wall having said first portions with each of said openings being adjacent one of said first portions of said hollow tubular member to permit deformation of said first portions for disposition in said grooves in said one member without shearing of said hollow tubular member.

12. The combination according to claim 7 in which:
the other of said driving and driven members has at least two spaced grooves therein;
said hollow tubular member has spaced second portions for disposition within each of said grooves in said other member and forming the sole connection between said hollow tubular member and said other member;
second separate means engages each of said second portions of said hollow tubular member when each of said second portions is disposed in one of said grooves in said other member to retain said second portions of said hollow tubular member in said grooves in said other member;
second means carried by said hollow tubular member and surrounding said second separate means;
and means supported by said second means and cooperating with each of said second separate means to insure that each of said second separate means retains said engaged second portion of said hollow tubular member in said groove in which said engaged second portion is disposed in said other member.

13. The combination according to claim 12 in which:
said hollow tubular member has openings in its wall having said first portions with each of said openings being adjacent one of said first portions of said hollow tubular member to permit deformation of said first portions for disposition in said grooves in said one member without shearing of said hollow tubular member;
and said hollow tubular member has openings in its wall having said second portions with each of said openings being adjacent one of said second portions of said hollow tubular member to permit deformation of said second portions for disposition in said grooves in said other member without shearing of said hollow tubular member.

14. The combination according to claim 12 in which:
each of said separate means comprises a circular-shaped rod disposed within each of said grooves in each of said driving and driven members;

and each of said supported means supported by said first means and said second means includes means acting one each of said rods to retain each of said rods partially in one of said grooves in each of said driving and driven members.

15. The combination according to claim 12 in which each of said grooves has its walls substantially perpendicular.

16. The combination according to claim 15 in which:
said hollow tubular member has openings in its wall having said first portions with each of said openings being adjacent one of said first portions of said hollow tubular member to permit deformation of said first portions for disposition in said grooves in said one member without shearing of said hollow tubular member;
and said hollow tubular member has openings in its wall having said second portions with each of said openings being adjacent one of said second portions of said hollow tubular member to permit deformation of said second portions for disposition in said grooves in said other member without shearing of said hollow tubular member.

17. In combination:
a driving member;
a driven member;
a coupling to connect said driving member to said driven member;
one of said driving and driven members having at least two spaced grooves therein;
said coupling including a hollow tubular member formed of a ductile material that is capable of being deformed without failure;
said hollow tubular member having spaced first portions for disposition within each of said grooves in said one member;
first means carried by said hollow tubular member retains each of said first portions of said hollow tubular member in one of said grooves in said one member;
said hollow tubular member has a longitudinal slit therein;
and each of said first portions comprises a part of said hollow tubular member on each side of said longitudinal slit in said hollow tubular member.

18. The combination according to claim 17 in which each of said grooves has its walls substantially perpendicular.

19. In combination:
a driving member;
a driven member;
a coupling to connect said driving member to said driven member;
one of said driving and driven members having at least two spaced grooves therein;
each of said grooves has its walls substantially perpendicular;
said coupling including a hollow tubular member formed of a ductile material that is capable of being deformed without failure;
said hollow tubular member having spaced first portions for disposition within each of said grooves in said one member;
and first means carried by said hollow tubular member retains each of said first portions of said hollow tubular member in one of said grooves in said one member;
each of said first retaining means includes:
a circular-shaped rod disposed within each of said grooves in said one member;
and means carried by said hollow tubular member and acting on each of said rods to retain each of said rods partially in one of said grooves in said one member.

20. The combination according to claim 17 in which:
the other of said driving and driven members has at least two spaced grooves therein;
said hollow tubular member has spaced second portions for disposition within each of said grooves in said other member;
second means is carried by said hollow tubular member and retains each of said second portions of said hollow tubular member in one of said grooves in said other member;
said hollow tubular member having a second longitudinal slit therein;
and each of said second portions comprising a part of said hollow tubular member on each side of said second longitudinal slit in said hollow tubular member.

21. The combination according to claim 20 in which each of said grooves has its walls substantially perpendicular.

22. The combination according to claim 19 in which:
the other of said driving and driven members has at least two spaced grooves therein;
said hollow tubular member has spaced second portions for disposition within each of said grooves in said other member;
and second means is carried by said hollow tubular member and retains each of said second portions of said hollow tubular member in one of said grooves in said other member;
each of said second retaining means includes:
a circular-shaped rod disposed within each of said grooves in said other member;
and means carried by said hollow tubular member and acting on each of said rods to retain each of said rods partially in one of said grooves in said other member.

UNITED STATES PATENT OFFICE
CERTIFICATE OF CORRECTION

Patent No. 3,603,624                    Dated September 7, 1971

Inventor(s) Lawrence A. Attermeyer

It is certified that error appears in the above-identified patent and that said Letters Patent are hereby corrected as shown below:

Column 1, line 26, "servosystem" should read -- servo system -- . Column 3, lines 42, 45, 51 and 74, "setscrews" should read -- set screws -- . Line 71, "Setscrews" should read -- Set screws -- . Column 4, line 3, "Set-" should read -- Set -- ; line 8, "29", first occurrence, should read -- 28 -- ; lines 23, 26, and 30, after "90°" insert a comma, each occurrence; line 62, "Setscrews" should read -- Set screws -- ; line 66, "setscrew" should read -- set screw -- . Column 5, lines 12, 19, 24, 40, line 43, each occurrence, "setscrew" should read -- set screw -- ; lines 40, 45, 68, 71, "setscrews" should read -- set screws -- . Column 6, line 18, "setscrews" should read -- set screws -- . Column 7, line 25, "number" should read -- member -- . Column 8, line 22, after "which" insert a colon. Column 9, line 2, "one" should be -- on -- .

Signed and sealed this 24th day of October 1972.

(SEAL)
Attest:

EDWARD M. FLETCHER, JR.                 ROBERT GOTTSCHALK
Attesting Officer                       Commissioner of Patents